US009310880B2

(12) United States Patent
Inderrieden et al.

(10) Patent No.: US 9,310,880 B2
(45) Date of Patent: Apr. 12, 2016

(54) SELF-SERVICE COMPUTER WITH DYNAMIC INTERFACE

(75) Inventors: Michael Thomas Inderrieden, Lawrenceville, GA (US); Jennie Psihogios Johnson, Suwanee, GA (US); Nathaniel Christopher Herwig, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 403 days.

(21) Appl. No.: 12/569,283

(22) Filed: Sep. 29, 2009

(65) Prior Publication Data

US 2011/0078637 A1    Mar. 31, 2011

(51) Int. Cl.

| G06F 3/0481 | (2013.01) |
|---|---|
| G06F 3/0482 | (2013.01) |
| G06F 9/44 | (2006.01) |
| G06Q 30/02 | (2012.01) |
| H04N 21/45 | (2011.01) |
| G06F 3/01 | (2006.01) |
| G06Q 10/10 | (2012.01) |

(52) U.S. Cl.
CPC .............. *G06F 3/011* (2013.01); *G06F 9/4443* (2013.01); *G06Q 10/10* (2013.01); *G06F 3/0481* (2013.01); *G06F 3/0482* (2013.01); *G06Q 30/02* (2013.01); *G06Q 30/0206* (2013.01); *G06Q 30/0237* (2013.01); *G06Q 30/0238* (2013.01); *H04N 21/4532* (2013.01)

(58) Field of Classification Search
CPC ... G06F 3/0481; G06F 3/0482; G06F 9/4443; G06Q 30/02; G06Q 30/0206; G06Q 30/0237; G06Q 30/0238; H04N 21/4532

USPC ......... 715/744, 747, 762, 866; 705/10, 14.37, 705/14, 37; 706/16, 21, 46, 47
See application file for complete search history.

(56) References Cited

U.S. PATENT DOCUMENTS

| 5,097,328 | A | * | 3/1992 | Boyette ........................ 348/150 |
|---|---|---|---|---|
| 5,504,675 | A | * | 4/1996 | Cragun et al. ............... 705/14.4 |
| 6,014,137 | A | * | 1/2000 | Burns ........................... 715/747 |
| 6,035,288 | A | * | 3/2000 | Solomon ........................ 705/37 |
| 6,199,754 | B1 | * | 3/2001 | Epstein ......................... 235/379 |
| 7,680,690 | B1 | * | 3/2010 | Catalano ........................ 705/15 |
| 2003/0018531 | A1 | * | 1/2003 | Mahaffy et al. ................. 705/16 |
| 2003/0088832 | A1 | * | 5/2003 | Agostinelli et al. .......... 715/526 |
| 2003/0107649 | A1 | * | 6/2003 | Flickner et al. ............... 348/150 |
| 2004/0111321 | A1 | * | 6/2004 | Kargman ........................ 705/16 |

(Continued)

FOREIGN PATENT DOCUMENTS

WO    WO 2005064515 A1 *  7/2005

OTHER PUBLICATIONS

Zivanov, Zarko, et al., "Using Code Generation Approach in Developing Kiosk Applications," ComSIS, vol. 5, No. 1, Jun. 2008, pp. 41-59.*

(Continued)

*Primary Examiner* — Eric J Bycer
(74) *Attorney, Agent, or Firm* — Paul W. Martin; Schwegman, Lundberg & Woessner

(57) ABSTRACT

A self-service computer with dynamic interface. The self-service computer includes a processor for receiving environment information, for selecting among different user interface features including different transaction screens and different transaction screen content based upon the environment information, and for providing selected user interface features during a transaction involving a customer.

17 Claims, 2 Drawing Sheets

FIG. 2

(56) References Cited

U.S. PATENT DOCUMENTS

| | | |
|---|---|---|
| 2004/0143512 A1* | 7/2004 | Sturr, Jr. .................... 705/26 |
| 2004/0181457 A1* | 9/2004 | Biebesheimer et al. ........ 705/26 |
| 2004/0243471 A1* | 12/2004 | Salmen et al. ................. 705/15 |
| 2005/0015301 A1* | 1/2005 | Johnson ....................... 705/15 |
| 2005/0108642 A1* | 5/2005 | Sinclair, II ................... 715/700 |
| 2005/0198661 A1* | 9/2005 | Collins et al. ................. 725/19 |
| 2006/0139312 A1* | 6/2006 | Sinclair et al. ............... 345/156 |
| 2006/0184800 A1* | 8/2006 | Rosenberg .................... 713/186 |
| 2007/0027806 A1* | 2/2007 | Sands et al. ................... 705/42 |
| 2007/0230681 A1* | 10/2007 | Boyer et al. ................. 379/265.1 |
| 2008/0246592 A1* | 10/2008 | Waalkes et al. ........... 340/286.09 |
| 2008/0255941 A1* | 10/2008 | Otto et al. ..................... 705/14 |
| 2009/0070764 A1* | 3/2009 | Guizar ......................... 718/102 |
| 2009/0119142 A1* | 5/2009 | Yenni et al. ................... 705/7 |

OTHER PUBLICATIONS

Rehg et al., "Vision for a Smart Kiosk," 1997 IEEE Computer Society Conference on Computer Vision and Pattern Recognition, 1997, pp. 690-696.*

* cited by examiner

SELF-SERVICE COMPUTER WITH DYNAMIC INTERFACE

BACKGROUND

Self-service computer systems have replaced assisted-service computer systems in many business environments today. For example, self-service computer systems may be found in banking, retail, hospitality, travel, entertainment, medical, and other environments.

Self-service computer systems typically provide a consistent interface for completing transactions, regardless of customer type, queue length, or other factors.

Past approaches for offering customized user experiences have required a user to log in to a self-service computer. The self-service computer retrieves stored preferences associated with the user and changes the user interface accordingly. In addition, some self-service computers display buttons to change user interface parameters, such as volume or font size, on the fly.

Therefore, it would be desirable to provide a self-service computer with a dynamic interface that is not necessarily based upon knowing the identity of a user.

SUMMARY

A self-service computer with a dynamic interface is provided.

The self-service computer includes a processor for receiving environment information, for selecting among different user interface options including different transaction screens and different transaction screen content based upon the environment information, and for providing selected user interface features during a transaction involving a customer.

DETAILED DESCRIPTION

Figure 1:
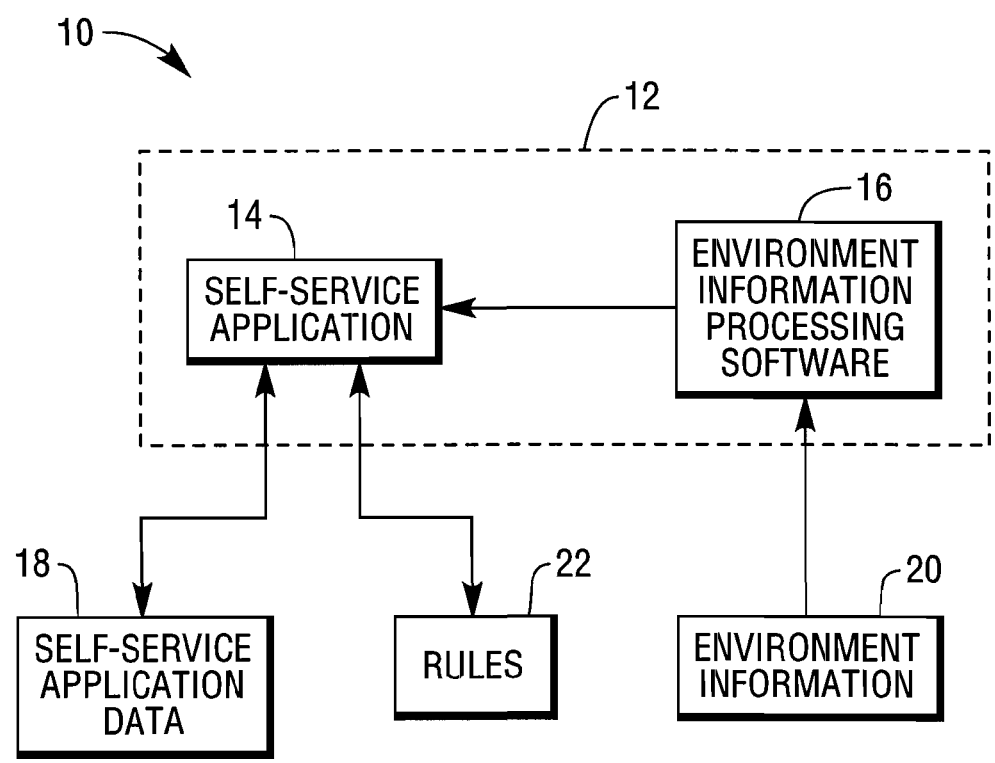
FIG. 1 illustrates a block diagram of an example self-service computer.

Referring now to FIG. 1, an example self-service computer 10 includes processor 12 which executes self-service application 14 and environment information processing software 16.

Self-service application 14 provides user interface options or features from self-service application data 18 to customers in order to process transactions. User interface features may include transaction screens and transaction screen content. User interface features may additionally include multimedia features including audio and video features.

Self-service application data 18 may include one or more templates or skins populated with transaction items. For example, in a quick service restaurant, self-service application 14 may display a template populated with images of food items stored locally and/or obtained from a host server computer that distributes images of menu items to a plurality of quick service restaurants.

Self-service computer 10 executes environment information processing software 16 which captures or receives environment information 20 and processes it for use by self-service application 14. Environment information 20 may include any information about the location of self-service computer 10.

Self-service computer 10 may receive environment information 20 from various sources. For example, self-service computer 10 may include one or more peripheral sensors, such as a camera, for capturing environment information 20. As another example, self-service computer 10 may receive environment information 20, such as outside weather information, from another computer via a network.

Example environment information 20 may include user type information, queue length, queuing time, weather conditions where self-service computer 10 is located (or outside a building in which self-service computer 10 is located).

User type information may include demographic categories, including gender and age. Example age types include juveniles, adults, and seniors. Additional categories are envisioned and possible by further segmenting these categories.

Self-service application 14 is dynamic in that it may provide a different user interface based upon different environmental information 20 provided by environment information processing software 18. Thus, self-service application 14 may display different transaction screens and transaction screen content, and/or vary individual user interface features such as volume, font type and size, and color based upon the information in its environment.

Self-service application 14 may also rely on customer identification information, if provided via loyalty card or other input, but customer identification information is not necessarily required by self-service application 14 to select a user interface. Self-service application 14 is capable of selecting user interface features without customer identification information.

Self-service application 14 may rely on rules 22 for selecting user interface features. Rules 22 may be derived from previously collected customer interactions stored in purchase data.

For example, self-service application 14 may choose and display different templates based upon environmental information 20 and rules 22. If information processing software 18 detects a female adult, self-service application 14 may display a template with user interface features tailored to women. If information processing software 18 detects a teenager, self-service application 14 may display a template with user interface features tailored to teenagers.

As another example, self-service application 14 may vary individual user interface features, such as font size, color, contrast, and audio volume based upon environmental information 20 and rules 22. If information processing software 18 detects a senior citizen or person who is likely above a certain age, self-service application 14 may adjust font size, color and contrast, and audio volume to larger/higher levels.

In addition, self-service application 14 may follow different workflows for different demographics based upon environmental information 20 and rules 22. Again, using the example of a senior citizen, self-service application 14 may provide a more straightforward, human-like interaction. For younger users who tend to be more comfortable with technology, self-service application 14 may provide a more streamlined workflow, using common text-messaging shortcuts or even a video-game motif.

As yet another example, self-service application 14 may choose and display different avatars based upon environmental information 20 and rules 22. Self-service application 14 may choose an avatar suited to the demographic of the user, either one like the demographic or one which complements the demographic.

Any of self-service application data 18, environment information 20, and rules 22 may alternatively be stored at a server computer connected to self-service computer 10 via a network. Environment information processing software 16 may also be executed by a server computer instead of self-service computer 10.

Self-service computer 10 additionally includes memory, program and data storage, a display, and one or more user input devices. The display and user input device may be combined as a touch screen.

Self-service computer 10 may execute an operating system such as a Microsoft® operating system, which can display screen information within one or more windows.

Self-service computer 10 additionally includes components and peripherals necessary to accomplish the purpose for the environment in which it is located. For example, self-service computer 10 may additionally include, but not be limited to, one or more payment peripherals and a receipt printer. Example payment peripherals include a card reader, a currency and/or coin acceptor, and a currency and/or coin dispenser.

The venue for self-service computer 10 may be any venue suited to completing a self-service transaction. For example, self-service computer 10 may be located at a retail store, airport, hotel, rental car facility, restaurant, health care facility, or other venue.

Figure 2:
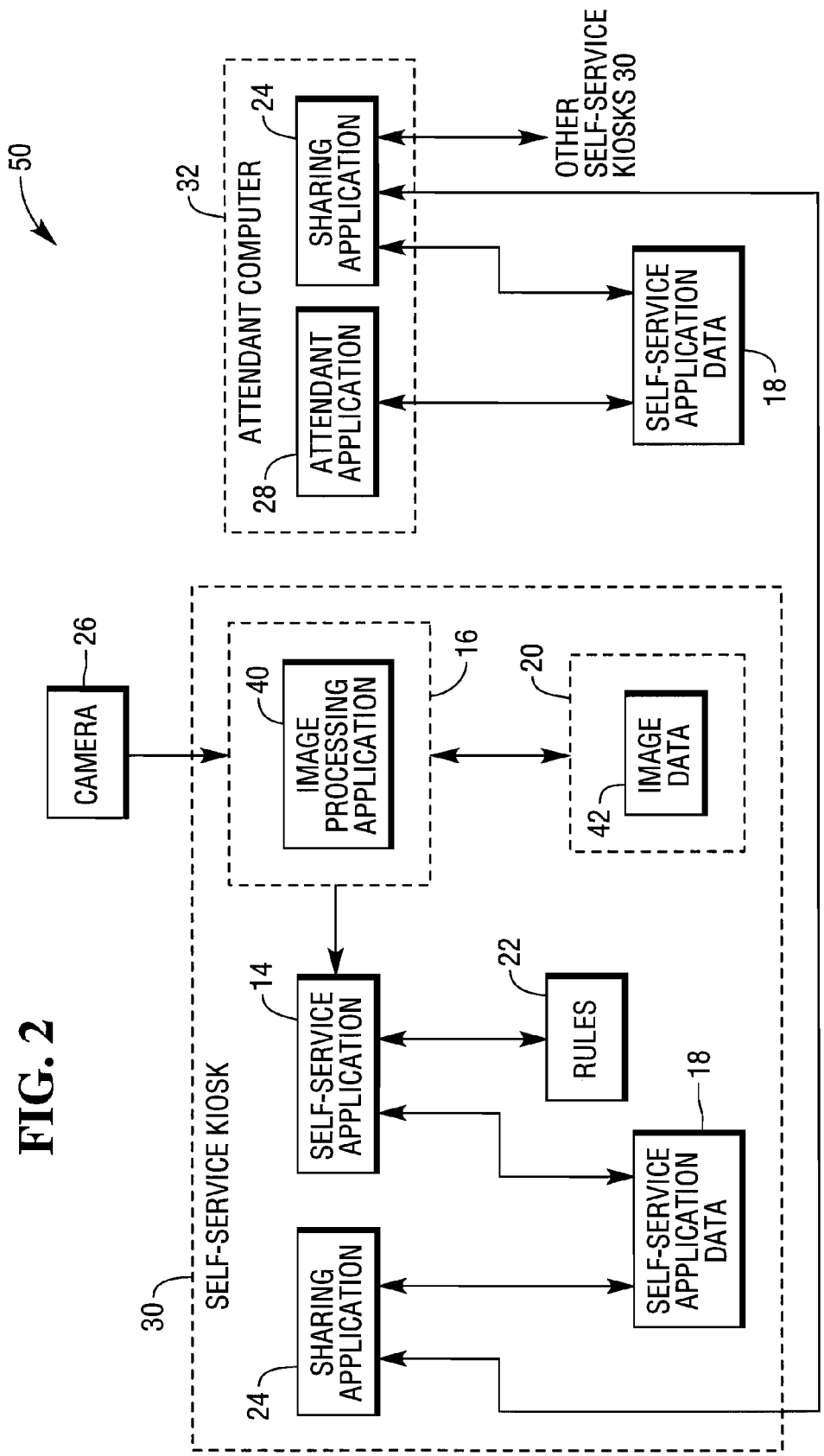
FIG. 2 illustrates a block diagram of an example transaction system including the self-service computer.

Referring now to FIG. 2, an example system 50 in a quick service or fast food venue includes one or more attendant computers 32 and one or more self-service kiosks 30.

In this example, self-service kiosk 30 includes camera 26. Camera 26 may be positioned to capture images of the entire queuing area adjacent self-service kiosk 30.

Environment information processing software 16 includes image processing application 40. Image processing application 40 captures image data 42 using camera 26, compares captured image data 42 to reference facial characteristic data 44 to determine a customer type, and provides the customer type information to self-service application 14. Self-service application 14 selects self-service application data 18 for display based upon the determined customer type and rules 22.

For example, image processing application 40 may determine gender, approximate age, ethnicity, group status, presence of children, and other anonymous characteristics associated with a customer. Self-service application 14 uses this classification information to choose and tailor any of different templates, workflows, menu options, promotions, suggestive sell options, instructions, color contrast and schemes, font size audio prompts and levels, avatars, voices and/or other user interface features from self-service application data 18 based upon rules 22.

As another example, image processing application 40 may capture image data tracking customer journeys from the time they enter the field of view until they press the first button on self-service kiosk 30. Self-service application 14 selects self-service application data 18 for display based upon the determined journey and rules 22.

Image processing application 40 may calculate actual customer queuing time along the journey. Self-service application 14 may track the following times: 1) "customer ordering time" (e.g., the time from a first screen touch until a "Pay Now" touch, 2) "customer payment time" (e.g. the time from a "Pay Now" touch until a receipt is printed, 3) "customer wait for food time" (e.g., the time from when the receipt is printed until an attendant or other employee first scans a printed order barcode indicating that the customer's order is ready for pickup, and 4) "customer leave counter area with food time" (e.g., the time from a first scanning of the order barcode until a second scanning of the order barcode indicating that the customer picked up the food order.

As yet another example, image processing application 40 may determine customer queue length, a total number of customers waiting to place orders using self-service kiosk 30, and a percentage of queuing area currently being occupied by customers waiting to use self-service kiosk 30.

The self-service ordering interface presented by self-service application 14 is dynamic depending on the state of the customer queues. An example rule 22 is to limit the number of upselling prompts, and/or display a different opening menu containing only top selling items if the customer queue is greater than about eight customers, and/or the queuing area in front of self-service kiosks 30 is more than 50% occupied. The objective is to improve service levels and to speed up the ordering process when the customer queue reaches a certain pre-defined critical level to reduce the likelihood of customers leaving the queue/restaurant.

Other environment information 20 is also envisioned. For example, real-time weather information for a given restaurant's location would dynamically influence suggestive selling prompts shown to the customer by self-service application 14. During hot weather, self-service application 14 may offer ice cream, milkshakes, ice coffee, freeze pops, and other food items that customer purchase histories have shown are popular during hot weather. During cold weather, self-service application 14 may offer coffee, tea, chili, and other food items that customer purchase histories have shown are popular during cold weather.

Attendant computer 32 and self-service kiosk 30 may be located in close proximity to another so that an attendant may see and verbally interact with a customer.

Alternatively, attendant computer 32 and self-service kiosk 30 and may be located separately from each other. For example, self-service kiosk 30 may be located in a drive-through lane or in a play area.

Self-service kiosk 30 allows a self-service customer to perform a transaction with or without assistance from an attendant at attendant computer 32. Self-service application 14 displays screens from self-service application data 18, which includes images of food items available for selection by a customer and food selections already made by the customer.

Self-service kiosk 30 additionally executes sharing application 24, which sends information to attendant computer 32, including the identity of a currently displayed screen and any selections made by a customer on that screen. Sharing application 24 further receives selections made by an attendant at attendant computer 32.

Self-service application 14 stores the selections as updates to self-service application data 18. Thus, sharing application 24 ensures that locally stored self-service application data 18 on self-service kiosk 30 is synchronized with self-service application data 18 stored by attendant computer 32. A customer at self-service kiosk 30 sees the same display information that is displayed by attendant computer 32. The customer can make selections and the attendant can watch the customer selections in real time as they are performed.

Attendant computer 32 is coupled to one or more self-service kiosks 30. Attendant computer 32 allows an attendant to interact with a customer at any of self-service kiosks 30 during a transaction. Attendant computer 32 executes attendant application 28, which accesses local or remote copies of self-service application data 18 associated with each of the self-service kiosks 30 to obtain data defining a screen currently displayed by one or more self-service kiosks 30.

Attendant computer 14 further executes sharing application 24, which receives the identity of the screen currently displayed by self-service application 14, and any selections made by a customer on that screen.

Attendant application 28 stores the screen identity information and the selections in the locally stored copy of self-service application data 18. Thus, sharing application 24 ensures that locally stored self-service application data 18 on attendant station 32 are synchronized with self-service application data 18 stored on self-service kiosk 30. An attendant at attendant computer 32 sees the same display information that is displayed by self-service kiosk 30. The attendant can make selections on behalf of the customer and the customer can watch the attendant selections as they are performed.

Attendant application 28 and self-service application 14 may optionally hand off payment processing to other transaction software on an in-store computer.

Although particular reference has been made to certain embodiments, variations and modifications are also envisioned within the spirit and scope of the following claims.

What is claimed is:

1. A self-service computer kiosk for a business venue and for conducting sales transactions with plural customers, the kiosk comprising:
   a processor configured to execute executable instructions from a non-transitory computer-readable storage medium, the instructions when executed configured to receive environment information during a sales transaction involving a customer purchasing a customer-selected sale item, to select among different templates for different sales transaction screens and among different sales transaction screen content based upon the environment information, and to provide selected sales transaction screens based upon selected templates and containing selected sales transaction screen content without specifically identifying the customer and without customer identification information, and the processor configured to interact with a camera to track customer order time, customer payment time, customer wait time, and customer leave counter area time for purposes of calculating queueing times;
   wherein the different sales transaction templates define different user interface options including different selectable sales transaction functions, and wherein the environment information determines different workflows for the user interface options based on a demographic assigned to the customer, and wherein select ones of the user interface options are provided with the sales transaction templates based upon the environment information, the select ones of the user interface options include: a font size for displaying fonts of the selected sales transaction screen content, volume, and color based upon the environment information; and
   wherein the different sales transaction screens content includes selectable sale items including the customer-selected sale item, and the different sales transaction screens suited to the demographic associated with the customer based on the environmental information and thereby providing conducting the sales transactions with the plurality of customers from the self-service computer kiosk.

2. The self-service computer kiosk of claim 1, wherein the processor also selects the user interface options based upon rules.

3. The self-service computer kiosk of claim 2, wherein the rules are based upon previously extracted information about customers.

4. The self-service computer kiosk of claim 1, wherein the environment information further comprises customer type information.

5. The self-service computer kiosk of claim 4, wherein the customer type information comprises gender.

6. The self-service computer kiosk of claim 4, wherein the customer type information comprises age.

7. The self-service computer kiosk of claim 1 further comprising:
   the camera positioned to capture images of a queuing area adjacent the self-service computer; and
   an image processing application adapted to determine a customer queue length within the queuing area.

8. The self-service computer kiosk of claim 1, wherein the environment information further comprises queuing time.

9. The self-service computer kiosk of claim 1, wherein the environment information further comprises weather conditions that include the outdoor air temperature for offering different transaction screens for temperature sensitive items.

10. The self-service computer kiosk of claim 1, wherein the different user interface options comprise different avatars.

11. The self-service computer kiosk of claim 1 further comprising:
    a touch screen combining a display for displaying the different transaction screens and a user input device; and
    a card reader.

12. The self-service computer kiosk of claim 11 further comprising:
    a receipt printer.

13. The self-service computer kiosk of claim 1 further comprising:
    the camera positioned to capture images of a queuing area adjacent the self-service computer; and
    an image processing application adapted to utilize said images and track customer movement in the camera field of view.

14. The self-service computer kiosk of claim 1, wherein the kiosk is a food ordering kiosk located in a fast food venue and wherein the business transaction is a food purchase transaction, and wherein the selectable transaction functions include food menu options and food promotions, and wherein the selectable items include food items for purchase.

15. The self-service computer kiosk of claim 14, wherein the environment information includes journey information that tracks a journey of the customer to the kiosk and wherein to select among the different user interface options includes using the journey information.

16. A self-service computer kiosk for conducting sales transactions with a plurality of customers, comprising:
    a camera adapted to capture images of a location in front of the self-service computer containing at least one customer; and
    a processor configured to execute executable instructions from a non-transitory computer-readable storage medium, the instructions when executed configured to extract environment information from the images including information about the one customer during a sales transaction involving the one customer purchasing a customer-selected item, to classify the one customer into a customer type out of a plurality of different customer types, to select a template among different templates for different sales transaction screens and screen content among different sales transaction screen content based upon the customer type, and to provide selected sales transaction screens based upon selected templates and containing selected sales transaction screen content without specifically identifying the customer and without customer identification information and the processor configured to interact with a camera to track customer order time, customer payment time, customer wait time, and customer leave counter area time for purposes of calculating queueing times;

wherein the different sales transaction templates define different user interface options including different selectable sales transaction functions, and wherein the environment information determines different workflows for the user interface options based on demographics assigned to the customer, and wherein select ones of the user interface options are provided with the sales transaction templates based upon the environment information, the select ones of the user interface options include: a font size for displaying fonts of the selected sales transaction screen content, volume, and color based upon the environment information and the selected sales transaction screen suited to the demographic associated with the customer based on the environmental information; and wherein the different sales transaction screen content includes selectable sale items including the customer-selected sale item and thereby conducting the sales transactions with the plurality of customers from the kiosk.

17. A method for conducting sales transactions with a plurality of customers, the method implemented as executable instructions residing in a non-transitory computer-readable storage medium and executed by a hardware processor of a self-service computer kiosk, the method comprising:

receiving environment information by the executable instructions executing on the hardware processor of the self-service computer kiosk for completing a sales transaction including a customer queue level;

selecting, by the executable instructions, among different templates for different sales transaction screens and among different sales transaction screen content based upon the environment information, the different sales transaction templates defining different user interface options including different selectable sales transaction functions; and wherein the number of different sales transaction screens is limited for a customer involved in the sales transaction when the customer queue level reaches a pre-defined critical level limit; and providing, by the executable instructions, selected sales transaction screens based upon selected templates and containing selected sales transaction screen content including a customer-selected sales item without specifically identifying the customer involved in the sales transaction by the self-service computer kiosk and without customer identification information, and wherein select ones of the user interface options are provided with the selected templates based upon the environment information, the select ones of the user interface options include: a font size for displaying fonts of the selected sales transaction screen content, volume, and color based upon the environment information, and wherein the environment information determines different workflows for the user interface options based on a demographic assigned to the customer, and the selected sales transaction screens suited to a demographic associated with the customer based on the environmental information and thereby conducting the sales transactions for the plurality of customers, and tracking a camera customer order time, customer payment time, customer wait time, and customer leave counter area time for purposes of calculating queueing times.

* * * * *